E. V. MYERS.
LUBRICATION INDICATOR.
APPLICATION FILED JAN. 22, 1919.

1,331,820. Patented Feb. 24, 1920.

WITNESS:
Rene' Spuine

INVENTOR
Eugene V. Myers
By Attorneys,
Fraser, Fink & Myers

UNITED STATES PATENT OFFICE.

EUGENE V. MYERS, OF EAST ORANGE, NEW JERSEY.

LUBRICATION-INDICATOR.

1,331,820.   Specification of Letters Patent.   Patented Feb. 24, 1920.

Application filed January 22, 1919. Serial No. 272,478.

*To all whom it may concern:*

Be it known that I, EUGENE V. MYERS, a citizen of the United States of America, residing in East Orange, in the county of Essex and State of New Jersey, have invented certain new and useful Improvements in Lubrication-Indicators, of which the following is a specification.

This invention relates to a lubrication indicator for motor cars.

The greatest cause of early deterioration of motor-cars is the lack of lubrication of the moving parts. Any moving mechanism requires lubrication, but with complicated structures, such as motor-cars, in the hands of unskilled users the lack of proper attention to lubrication is the source of great trouble and expense to the owner. Furthermore, it is the cause of constant friction between the owner and the motor-car manufacturer in the matter of replacements and repairs. At the present point in the art most motor-cars are provided with adequate lubricating devices which if kept filled will keep the car in good running condition for an indeterminate length of time. But they require the care and attention of the owner or driver in the replenishment of oil and grease. As far as possible such lubricating systems are automatic in their nature, but many parts of the car are not susceptible to practical automatic lubrication, and those parts which are automatically lubricated require more or less frequent replenishment. In most cars there is a definite period when such replenishment should take place to keep the car in its best running condition, but the motor-car owner is compelled to rely upon his recollection or some extraneous memorandum. Furthermore, such periods of replenishment are but little affected by the time element; they depend essentially upon the mileage or service of the car. Very few owners are careful enough to keep an accurate record of the mileage and perform the acts which are necessary to keep the car in its best running condition. By far the greater proportion of users continue to drive the car until warned by some overheating or unusual noise that certain parts require lubrication. In the absence of an absolutely automatic lubricating system for all parts of the car, it has been thought to be inevitable that a certain lack of lubrication would take place in a large proportion of cases.

According to the present invention, I provide a device for facilitating or securing proper lubrication. To this end I provide a lubricating indicator which preferably is in the form of a wheel or disk driven by the car, and which shows an indication of lubricating requirements at the particular time when these are necessary or desirable. Preferably this wheel has a step-by-step motion and changes its position on the basis of some unit of mileage. Selecting as such unit 100 miles in a typical case, at the end of the first 100 miles the disk will indicate that all grease cups should be turned up. At the end of 200 miles the disk will indicate, for instance, that the engine case should be filled with oil. At the end of 300 miles the disk will indicate that the grease cups should again be turned up, and so on. At the period selected for oiling the transmission, say, 500 miles, this will be indicated. At the end of 1000 miles it is ordinarily desirable to repack the universal joint housings and the differential case. This is merely by way of example, it being understood that before a part will have gotten to the point where it is in danger from lack of lubrication, the indicating disk will show what is required in the interest of proper running of the car. The element of gasolene required may also be included and also the element of radiator water. Such other considerations as reversing the front and rear tires, replenishment of the battery water, and the testing of battery, may and preferably should be included. In fact any indication which is based upon the mileage or service of the car can with good effect be included. Among these may be further mentioned cleaning carbon out of cylinders, grinding of valves, etc. Many of these operations if taken in time will greatly promote the longevity of the car and its proper operation. Such operations are herein meant to be included under the term "lubrication".

It is convenient to adopt a certain fixed mileage and then repeat. Thus, for instance, 1000 miles may be adopted in many cars as the mileage of a complete cycle of operations.

If such a system is adopted, the device may be easily constructed by providing an indicating wheel which is connected to the ordinary speedometer, so as to turn coincidently with the 100-mile wheel which rotates ten times in each 1000. The indicator wheel will hence be turned one step in each 100 miles, and will show on its periphery opposite the indicating opponent the legend required for that particular mileage. Or the indicator wheel may be driven by a separate drive shaft from the motor or car-wheel and be given an intermittent motion similar to that of the ordinary speedometer or odometer. A part of the advantage may be secured by the provision of a wheel or band moved by hand, in which case the wheel or band will have the mileage printed with each legend. The user in this case will move the wheel or band after each trip, so that its mileage keeps pace with the mileage of the odometer.

Preferably in the automatic device the indicator is moved with a step-by-step movement, and a particular indication will remain in place for a given mileage. Let us say that it is preferable to turn up the grease cups once in each 100 miles. At the end of each 100 miles the legend will appear and remain in plain sight for the next period of 100 miles (or a lesser distance), being thereby a constant indication of the necessity of grease cup lubrication. However, the disk may, if desired, be constantly driven with a very slow movement taken form the car or motor so that the indication moves very slowly past the indicating window. In this case, the indication will remain in plain sight for a predetermined period of time.

The device is conveniently mounted on the dash of the car at or near the speedometer, so that it is constantly in plain sight.

In the drawings, wherein I have shown one embodiment of the invention,—

Figure 4:
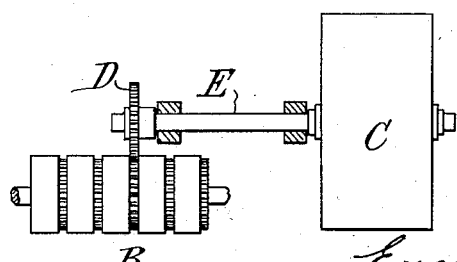
Fig. 4 is a detail view showing the invention as connected with a standard odometer.

Referring to Fig. 4, which shows in detail the connection between the indicator C and the odometer B, it will be seen that the odometer comprises a series of indicating wheels for recording the units, tens, hundreds, thousands, etc. The odometer may be of any suitable type, as, for instance, that shown in Patent No. 1,110,835. In this construction, each of the indicating wheels has a series of teeth at one side thereof, and these teeth are utilized in the construction shown for driving a gear D, which in turn drives the shaft E of the indicating disk C. The device is shown as meshed with the hundreds wheel, and as the gear D is of the same diameter as that of the wheel, the disk C will be driven at the same speed. It will hence rotate one step for each step of the indicator wheel. This will present ten indications for each thousand miles. By varying the proportions of the gears and the odometer wheel from which the drive is taken, numerous combinations can be made.

The disk C may be suitably inclosed in a housing F which is preferably detachably secured to the dash A. An opening is preferably provided in the dash which may have a glass window, or magnifying glass G.

Figure 1:
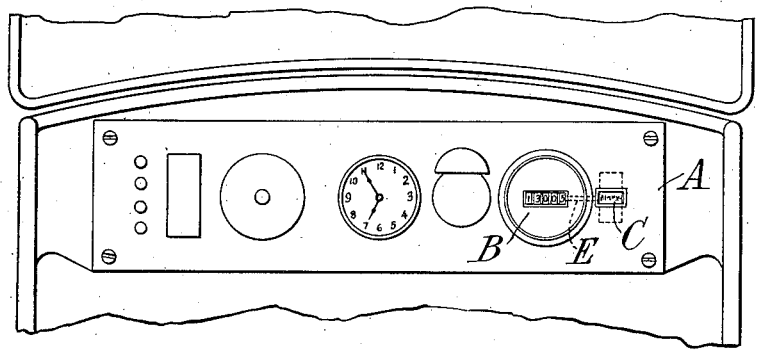
Figure 1 is an inside view of the dash of an automobile, looking forward from the position of the driver's seat.
Figure 2:
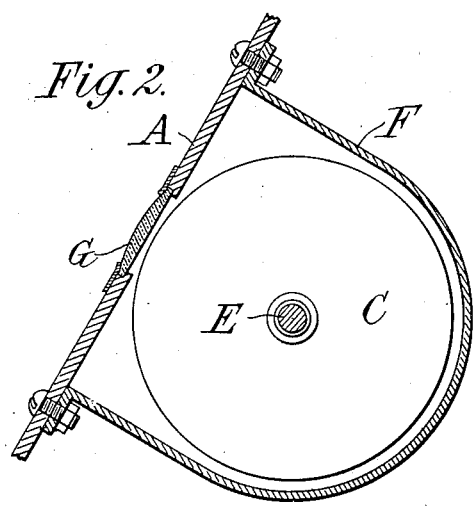
Fig. 2 is a sectional view of the indicating wheel, showing the opening in the dash.
Figure 3:
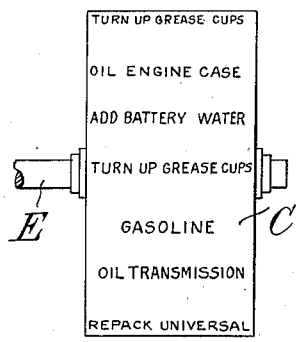
Fig. 3 is a face view of the wheel.

As before stated, the lubricating or other requirements may be adapted to the particular car to which it is applied. Fig. 3 shows a conventional arrangement, but this, of course, may be widely varied.

While I have shown and described one form of the invention, it will be understood that I do not wish to be limited thereto, since various changes may be made therein without departing from the spirit of the invention.

What I claim is:—

1. An indicating device for motor-cars comprising a movable indicator constructed independently of the odometer mileage wheels, means for moving said indicator to correspond to the mileage of the car, and said indicator being provided with a plurality of indicia showing the requirements of the car with regard to lubrication.

2. An indicating device for motor-cars comprising a movable indicator constructed independently of the odometer mileage wheels, means connecting a moving part of the car with said indicator whereby the indicator is moved to correspond to the mileage of the car, and said indicator being provided with a plurality of indicia showing the requirements of the car with regard to lubrication.

3. An indicating device for motor-cars comprising a movable indicator constructed independently of the odometer mileage wheels, means for giving said indicator a step-by-step motion corresponding to the mileage of the car, and said indicator being provided with a plurality of indicia showing the requirements of the car with regard to lubrication.

4. The combination with a mechanism having parts to be lubricated, of a movable indicator and means for moving it in correspondence with the travel of the mechanism, said indicator being provided with a plurality of indicia showing the requirements with regard to lubrication, and said indicator being constructed independently of revolution counting mechanism.

5. The combination with a mechanism having a part to be lubricated, of an indicator and means for giving it an intermittent movement in accordance with the amount of travel of the mechanism, said indicator being provided with a plurality of indicia showing the requirements with regard to lubrication, and said indicator being constructed independently of revolution counting mechanism.

6. The combination with a power-driven vehicle having lubricating requirements for its moving parts in combination with an odometer, and an indicating means comprising an indicator which is constructed independently of the mileage wheels of the odometer, means for giving said indicator a step-by-step motion corresponding to the mileage of the car, and said indicator being provided with a plurality of indicia showing the requirements of the car with regard to lubrication.

7. The combination with a power-driven vehicle having lubricating requirements for its moving parts, of an odometer and an indicating device constructed independently of said odometer wheels but driven by the latter and thereby given a step by step motion corresponding to the mileage of the car, said indicating device having a plurality of indicia showing the requirements of the car with regard to lubrication.

8. The combination in a motor car of an odometer mounted in substantially stationary position, an indicator constructed independently of the mileage wheels of the odometer and movable with relation to the odometer, and provided with a plurality of indicia showing the lubricating requirements of the car, said indicator being adapted for movements corresponding to the mileage of the car to bring said various indicia into indicating position for showing the parts then requiring lubrication.

In witness whereof I have hereunto signed my name.

EUGENE V. MYERS.